Jan. 24, 1967    R. K. SHELBY    3,300,551
PROCESS FOR SELECTIVELY FOAMING SURFACE
AREAS ON A PLASTIC ARTICLE
Filed Oct. 28, 1964
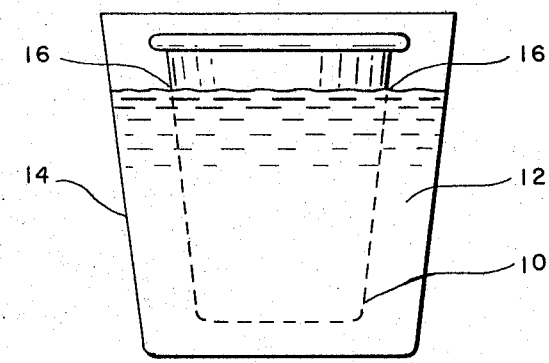
_Fig. I_
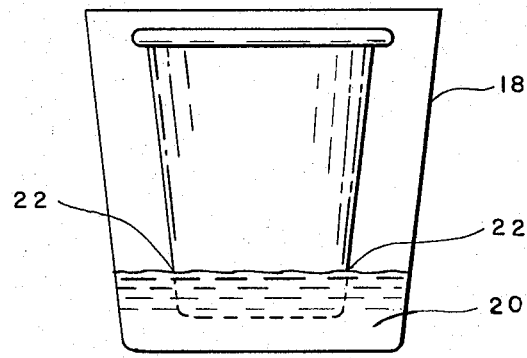
_Fig. II_
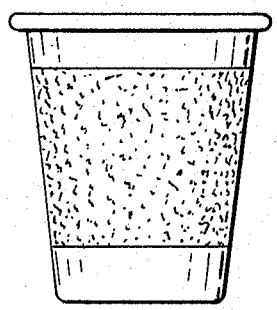
_Fig. III_
RICHARD K. SHELBY  INVENTOR.
BY James C. Jogmasini
ATTORNEY.

United States Patent Office 3,300,551
Patented Jan. 24, 1967

3,300,551
PROCESS FOR SELECTIVELY FOAMING SURFACE AREAS ON A PLASTIC ARTICLE
Richard K. Shelby, Downers Grove, Ill., assignor to Monsanto Company, St. Louis, Mo., a corporation of Delaware
Filed Oct. 28, 1964, Ser. No. 407,101
4 Claims. (Cl. 264—45)

The present invention relates to the manufacture of plastic articles and more particularly to the manufacture of plastic articles having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involve adhering or bonding solid or rigid members to the foam. However, these structures are generally difficult and expensive to construct and are sometimes limited in their application depending on the effectiveness of the bonding operation and the difficulty of preserving the foam intact.

In a copending application Serial Number 272,540, filed April 12, 1963, now Patent No. 3,262,625, there is described the formation of plastic articles which combine the insulating characteristics of foamed resin and the structural stability and strength of non-foamed plastic. In brief, these plastic articles are produced by steeping a plastic article in a fairly volatile medium which is absorbable by the plastic for a predetermined interval of time, removing the plastic article from the medium and finally heating the plastic article to produce a foamed cover. In this manner, plastic articles such as containers, conduits, etc. are obtained which have good insulating and structural characteristics. Unfortunately, serious problems have been encountered when attempting to control the extent of the area or surface on the plastic article to be foamed. This is primarily due to the difficulty of controlling the area extent of medium contact with the plastic article particularly at high speed production operations.

Accordingly, it is a principal object of the present invention to partially foam predetermined surface areas on plastic articles.

Another object of the present invention is to partially foam predetermined surface areas on plastic articles at high speed production rates.

A further object of the present invention is to control the extent of the foamed surface area on plastic articles which are exposed to a medium which is absorbable by the plastic and subsequently heated to foam portions of the plastic surface areas exposed to the medium.

A further object of this invention is to provide method and means to attain the preceding objects.

Other objects of this invention will in part be obvious and will in part appear hereinafter.

These and other objects are attained by exposing a surface of a plastic article to a primary liquid substance which is absorbable by the plastic and which will form a constant boiling mixture, when combined with a secondary liquid substance, having a boiling point temperature above the boiling point temperature of the primary liquid substance, selectively steeping at least a portion of said exposed surface in said secondary liquid substance and subjecting said exposed surface to a temperature which is between the boiling point temperature of said primary liquid substance and the boiling point temperature of said constant boiling mixture to produce a foam covering at the previously exposed and unsteeped areas. The primary liquid substance is considered to be any material which is (1) absorbable by the plastic being processed, (2) convertible to a gaseous state at a temperature below the melting point temperature of the plastic and (3) will form a constant boiling mixture when combined with a secondary liquid substance having a boiling point temperature above the boiling point temperature of the primary liquid substance. The secondary liquid substance is, of course, any liquid material which when combined with the primary liquid substance will form the constant boiling mixture. The plastic articles generally referred to herein include articles which are either wholly or partially fabricated from plastic.

The following drawings are provided for the purpose of illustrating various embodiments of the present invention.

FIGURE I is a side view, partly in section, illustrating a container being partially submerged in a primary liquid substance which is absorbable by the plastic.

FIGURE II is a side view, illustrating the same container shown in FIGURE I being selectively steeped with a secondary liquid substance in accordance with the practice of this invention.

FIGURE III is a side view of the container shown in FIGURES I and II after being subsequently heated to produce a foam covering.

Referring in detail to the figures of the drawings, and more specifically FIGURE I, there is schematically shown a container 10 which is substantially submerged in a primary liquid substance 12 confined in a tank 14 up to an immersion line designated 16—16. The container 10 is maintained in this position for a short interval of time before it is removed and transported towards and into a tank 18 shown in FIGURE II which contains a secondary liquid substance 20. As a result of this latter operation, the lower portion of the container is steeped in the secondary liquid substance 20 up to the line of immersion 22—22. After a few seconds, the container is removed from tank 18 and subjected to a heating operation which causes the surface area of the container between the immersion lines 22—22 and 16—16 to foam. In other words, it is possible to selectively foam portions of a plastic or partially plastic article of manufacture by first exposing part or all of the plastic surface of said article to a primary liquid substance and then selectively steeping portions of the previously exposed plastic surface with a secondary liquid substance to form a constant boiling mixture having a boiling point temperature above the boiling point temperature of the primary liquid substance to inhibit foaming at the steeped areas during the subsequent heating operation.

The above description and particularly the drawings are set forth for the purpose of illustrating and not for the purpose of limitation. In the place of containers, any plastic or partial plastic article of manufacture which is foamable by the process described in copending application Serial Number 272,540, filed April 12, 1963, may be treated in the same manner to foam selective portions of the article. In addition to the tanks shown in FIGURES I and II of the drawings, any suitable equipment may be substituted which will serve the purpose of initially exposing the plastic article to a primary liquid substance which is absorbable by the plastic and subsequently partially steeping the plastic article in the secondary liquid substance.

In general, the plastics treated in the practice of this invention are plastic materials which have been fabricated into various shapes and include polymers such as those based on styrene, vinyl halide, vinylidene halide, vinyl acetate, cellulose acetate or butyrate, ethyl cellulose, acrylic acid esters, metacrylic acid esters, acrylonitrile, ethylene, propylene and higher olefins, isobutylene, fluoroolefins and chlorofluoro-olefins, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber modified polystyrene or polystyrene which preferably has incorporated therein a rubber compound grafted onto the molecule.

As previously indicated, the primary liquid substance which may be employed in the practice of this invention is any liquid substance which is (1) absorbable by the plastic being processed, (2) convertible to a gaseous state at a temperature below the melting point temperature of the plastic and (3) will form a constant boiling mixture when combined with a secondary liquid substance having a boiling point temperature above the boiling point temperature of the primary liquid substance. In other words, after the initial exposure of the plastic surface to the primary liquid substance, a predetermined portion of the plastic surface is subsequently steeped in a secondary liquid substance. At the area contacted by both the primary and secondary liquids, a constant boiling mixture is formed which has a higher boiling point temperature than the primary liquid substance alone. It is therefore obvious that the choice of the primary liquid substance is limited to absorbable liquids which will form constant boiling mixtures of the type described and that the choice of the secondary liquid substance depends in turn on the initial choice of the primary liquid substance. More specifically, the choice is limited to liquid mixtures or systems which form constant boiling mixtures and meet the other requirements previously set forth. For example, acetone which has a boiling point of about 56° C. when mixed with chloroform which has a boiling point of approximately 61° C. will form a constant boiling mixture at about 62 mol percent chloroform having a boiling point temperature of about 62° C. Since acetone has a lower boiling point than chloroform, it is generally preferable that the acetone be used as the primary liquid substance and chloroform as the secondary liquid substance even though boiling point temperature of the chloroform is below the boiling point temperature of the constant boiling mixture. However, at times it may be desirable depending to some extent on the type of plastic being processed to utilize the higher boiling liquid component as the primary liquid substance if the boiling point temperature of this higher boiling component is still below the boiling point temperature of the constant boiling mixture. In general, it is preferable to employ constant boiling systems which exhibit a maximum boiling point temperature which is above the boiling point temperature of any of the combined substances forming the constant boiling mixture. Typical primary liquid:secondary liquid systems which may find utility in the present invention include acetone:chloroform, diethyl ketone-formic acid, methyl propyl ketone:formic acid, phenol:cyclohexanol, phenol:benzaldehyde, phenol:benzyl alcohol, cresol (o):acetophenone, cresol (o):phenyl acetate, cresol (o):methyl hexyl ketone, cresol (m):acetophenone, cresol (p):benzyl alcohol, cresol (p)-acetophenone and the like. In addition, some of the secondary liquid substances illustrated above may be used as the primary liquid substance and vice versa within the same system and it is also possible and sometimes desirable to utilize systems which require more than two components to form a constant boiling mixture. For example, ternary systems may find utility in the practice of this invention. In this instance, the primary liquid substance will be one or a mixture of two components and the secondary liquid substance will be the remaining component or components necessary to form the constant boiling mixture. A number of typical ternary systems forming constant boiling mixtures are listed below. There is no attempt in this listing to designate which component or components are preferred as the primary liquid substance since rather simple experimentation with the particular plastic being processed is all that is necessary to determine the optimum combination. Typical ternary systems therefore include water:carbon tetrachloride:ethanol, water:trichloroethylene:propyl alcohol, water:ethanol:benzene, carbon disulfide:methanol:ethyl bromide, methyl formate:ethyl bromide:isopentane, methyl formate:ethyl ether:pentane, propyl lactate:phenetol:methene, and the like.

The exposure of the plastic to the primary liquid substance generally requires only a few seconds for maximum absorption depending for the most part on the depth of foam desired, the type of primary liquid substance used, and the respective temperatures of the liquid substance and the plastic. This operation may be carried out by any suitable method such as immersion of the plastic article in the primary liquid substance or even by subjecting the plastic article to vapors of the primary liquid substance in a vessel which may or may not be pressurized.

With regard to the steeping operation, the time period of steeping is generally dependent on the type of primary liquid substance utilized and the time period of exposure to the primary liquid substance. In general, the optimum time of steeping to form the constant boiling mixture within the plastic can be readily determined by simple experimentation. The time balance should be such to produce little or no foaming at the area contacted by both the primary and secondary liquid substances. For the most part, the optimum time the plastic material should be exposed to the primary liquid substance will be determined first since this step has a substantial effect on the foam covering ultimately produced. In addition, the length of time between exposure to the primary liquid substance and the steeping operation should be kept to a minimum for optimum results.

In general, the plastic article is permitted to dry for a short interval of time between exposure to the primary liquid substance step and the subsequent heating operation. This drying interval allows deeper diffusion and serves to increase the number of cells and decrease their size. This is considered important for good insulating properties. If desired, the drying interval may be accelerated by forced air drafts, moderate heating conditions, etc. Since the steeping step is also carried out between the time of exposure to the primary liquid substance and the heating operation, it is generally preferred that the plastic article be steeped as soon as possible after exposure to the primary liquid substance so as not to overdry the plastic while still permitting sufficient time to permit the constant boiling mixture to form within designated surface areas of the plastic.

After the drying interval, the plastic article is heated in accordance with the practice of this invention to foam portions of the plastic article at designated areas, that is, those areas which were exposed to the primary liquid substance but not steeped. The heating means utilized may vary, the final results being affected by the uniformity of heating, rate of heating and temperature level at which it is conducted. The temperature level will, of course, be above the boiling point temperature of the primary liquid substance. Any of the fundamental types of heat transfer, i.e., conduction, convection, and radiation may be utilized. For ease of handling, methods depending on convection are generally preferred, that is, the use of a preheated fluid or more preferably a preheated gas circulating within, around or adjacent the plastic article resulting in a heat transfer from the gas to the plastic. In the case of biaxially oriented plastic, it is sometimes desirable to support or fix the sheet dimensionally during the heating operation to avoid loss of orientation.

The following example is given to illustrate the invention and is not intended as a limitation thereof. Unless otherwise specified, quantities are mentioned on a weight basis.

*Example I*

Styrene homopolymer having a Staudinger molecular weight of approximately 55,000 is injection molded in the form of a smooth, tapered cup which is approximately four inches in height with an average inside cup diameter of two and one-quarter inches.

The cup formed by the above-described operation is immersed in acetone up to within one-half inch of its top peripheral edge. After a ten second interval, the cup is withdrawn from the acetone and then dipped in chloroform (room temperature) up to one-half inch from its bottom edge for a 20 second interval. After the cup is withdrawn from the chloroform bath, it is exposed to dry room temperature conditions for 20 seconds and then heated by 60° C. air for a period of ten seconds.

The resulting cup has a foamed outer surface throughout the area previously immersed in the acetone except at the area which was steeped in the chloroform extending into the body of the cup approximately a third of its overall thickness. Further examination of the cup discloses that the overall structure properties of the cup are not seriously altered by the above-described process while at the same time the insulating properties of the cup are increased several fold.

The products of this invention are formed from plastic material either in whole or in part. The structures which may be fabricated in the practice of this invention are exceptionally useful for applications requiring high insulating characteristics at defined areas and good structural properties. The products formed in the practice of this invention can be most advantageously used in dispensing or vending applications which require stacking arrangements. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup foamed must be rigidly controlled.

It is obvious that many variations may be made in the products and processes set forth above without departing from the spirit and scope of this invention.

What is claimed is:

1. The process for selectively foaming predetermined surface areas on a plastic article which comprises exposing a surface of a plastic article to a primary liquid substance which is absorbable by the plastic and which will form a constant boiling mixture, when combined with a secondary liquid substance, having a boiling point temperature above the boiling point temperature of the primary liquid substance, selectively steeping at least a portion of said exposed surface in said secondary liquid substance and subjecting said exposed surface to a temperature which is between the boiling point temperature of said primary liquid substance and the boiling point temperature of said constant boiling mixture.

2. The process according to claim 1 wherein the boiling point temperature of the secondary liquid substance is also below the boiling point temperature of said constant boiling mixture.

3. The process according to claim 2 wherein the primary liquid substance is acetone and the secondary liquid substance is chloroform.

4. The process for selectively foaming predetermined surface areas on a plastic container which comprises exposing a portion of the outer surface of said container to a primary liquid substance which is absorbable by the plastic and which will form a constant boiling mixture, when combined with a secondary liquid substance, having a boiling point temperature above the boiling point temperature of the primary liquid substance, selectively steeping at least a portion of said exposed surface in said secondary liquid substance and subjecting said exposed surface to a temperature which is between the boiling point temperature of said primary liquid substance and the boiling point temperature of said constant boiling mixture.

References Cited by the Examiner

UNITED STATES PATENTS

| 3,042,972 | 7/1962 | Lafferty | 264—53 |
| 3,262,625 | 7/1966 | Russell et al. | 264—45 XR |

ALEXANDER H. BRODMERKEL, *Primary Examiner.*

P. E. ANDERSON, *Assistant Examiner.*